(12) United States Patent
Mori et al.

(10) Patent No.: US 12,479,094 B2
(45) Date of Patent: Nov. 25, 2025

(54) WORKPIECE HOLDING APPARATUS, WORKPIECE HOLDING METHOD, PROGRAM, AND CONTROL APPARATUS CAPABLE OF PREVENTING A SELECTED WORKPIECE FROM BEING ATTRACTED AND HELD BY OTHER WORKPIECES

(71) Applicant: TOYOTA JIDOSHA KABUSHIKI KAISHA, Toyota (JP)

(72) Inventors: Tatsuro Mori, Toyota (JP); Jun Ikarashi, Komaki (JP); Yoshiki Nagai, Toyota (JP); Toshio Ueshiba, Tokyo (JP); Yukiyasu Domae, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 517 days.

(21) Appl. No.: 17/893,522

(22) Filed: Aug. 23, 2022

(65) Prior Publication Data

US 2023/0085211 A1 Mar. 16, 2023

(30) Foreign Application Priority Data

Sep. 13, 2021 (JP) ................................. 2021-148423

(51) Int. Cl.
*B25J 9/16* (2006.01)
(52) U.S. Cl.
CPC ........... *B25J 9/1653* (2013.01); *B25J 9/1612* (2013.01); *B25J 9/1679* (2013.01); *B25J 9/1697* (2013.01)
(58) Field of Classification Search
CPC ...... B25J 9/1653; B25J 9/1612; B25J 9/1679; B25J 9/1697
See application file for complete search history.

(56) References Cited

U.S. PATENT DOCUMENTS

2012/0158180 A1\* 6/2012 Iio ........................ B25J 9/1679
901/31
2013/0211593 A1 8/2013 Domae et al.
(Continued)

FOREIGN PATENT DOCUMENTS

CN 104227723 A 12/2014
JP 2009128191 A \* 6/2009
(Continued)

*Primary Examiner* — Ramon A. Mercado
*Assistant Examiner* — Ellis B. Ramirez
(74) *Attorney, Agent, or Firm* — Oliff PLC (57) ABSTRACT

A workpiece holding apparatus include holding means for attracting and holding each workpiece in turn from among workpieces placed in a 3D space; first information acquisition means for acquiring 3D information of workpieces; candidate calculation means for calculating, based on the acquired 3D information of the workpieces, candidate holding points, the candidate holding points being, when the holding means holds each of the workpieces in turn, candidates for a holding point of that workpiece; second information acquisition means for acquiring information about each of other workpieces present within a predetermined range from each of the candidate holding points on the workpieces; and control means for selecting one of the candidate holding points based on the information about the workpiece acquired by the second information acquisition means, and controlling the holding means so that the holding means holds the workpiece at the selected candidate holding point.

11 Claims, 5 Drawing Sheets

(56) References Cited

U.S. PATENT DOCUMENTS

| | | | |
|---|---|---|---|
| 2013/0329035 A1* | 12/2013 | Yamamoto | B25J 9/16 |
| 2014/0031985 A1 | 1/2014 | Kumiya | |
| 2014/0277694 A1 | 9/2014 | Ichimaru | |
| 2014/0365010 A1* | 12/2014 | Yasuda | G06V 20/64 |
| 2015/0127161 A1 | 5/2015 | Satou | |
| 2017/0252929 A1 | 9/2017 | Fukada | |
| 2019/0351549 A1* | 11/2019 | Suzuki | B25J 15/0042 |

FOREIGN PATENT DOCUMENTS

| | | | | |
|---|---|---|---|---|
| JP | 2014-024142 A | | 2/2014 | |
| JP | 5558585 B2 | | 7/2014 | |
| JP | 5642738 B2 | | 12/2014 | |
| JP | 5767464 B2 | | 8/2015 | |
| JP | 5788461 B2 | | 9/2015 | |
| JP | 2016028836 A | * | 3/2016 | |
| JP | 2017-138176 A | | 8/2017 | |
| JP | 6423813 B2 | | 11/2018 | |
| JP | 2022160363 A | * | 10/2022 | B25J 13/08 |
| WO | 2021/177239 A1 | | 9/2021 | |

\* cited by examiner

WORKPIECE HOLDING APPARATUS, WORKPIECE HOLDING METHOD, PROGRAM, AND CONTROL APPARATUS CAPABLE OF PREVENTING A SELECTED WORKPIECE FROM BEING ATTRACTED AND HELD BY OTHER WORKPIECES

CROSS REFERENCE TO RELATED APPLICATIONS

This application is based upon and claims the benefit of priority from Japanese patent application No. 2021-148423, filed on Sep. 13, 2021, the disclosure of which is incorporated herein in its entirety by reference.

BACKGROUND

The present disclosure relates to a workpiece holding apparatus, a workpiece holding method, a program, and a control apparatus for holding a workpiece.

A technology for determining a holding point on a workpiece by performing pattern matching with a 3D (three-dimensional) model pattern that is created in advance by using 3D measurement information of the workpiece has been known (see Japanese Unexamined Patent Application Publication No. 2009-128191). Further, a technology for detecting the highest height position of a workpiece based on 3D measurement information of the workpiece and using the detected highest height position as a holding point of the workpiece has been known (see Japanese Unexamined Patent Application Publication No. 2016-028836).

SUMMARY

However, in the technology disclosed in Japanese Unexamined Patent Application Publication No. 2009-128191, it is necessary to create a 3D model pattern for each workpiece in advance, so it is impossible to, for example, handle a wide variety of workpieces. Further, in the technology disclosed in Japanese Unexamined Patent Application Publication No. 2016-028836, for example, if there is another workpiece near the highest height position of the workpiece to be attracted (e.g., sucked), there is a possibility that the other workpiece will also be attracted together with the workpiece to be attracted.

The present disclosure has been made to solve such problems, and one of the main objects thereof is to provide a workpiece holding apparatus, a workpiece holding method, a program, and a control apparatus capable of preventing, when a workpiece is attracted and held, other workpieces from being attracted and held together with the workpiece to be attracted and held.

In order to achieve the above-described object, a first exemplary aspect is a workpiece holding apparatus including:
holding means for attracting and holding each workpiece in turn from among a plurality of workpieces placed in a 3D (three-dimensional) space;
first information acquisition means for acquiring 3D information of the plurality of workpieces;
candidate calculation means for calculating, based on the 3D information of the plurality of workpieces acquired by the first information acquisition means, a plurality of candidate holding points, the plurality of candidate holding points being, when the holding means holds each of the workpieces in turn, candidates for a holding point of that workpiece;
second information acquisition means for acquiring information about each of other workpieces present within a predetermined range from each of the candidate holding points on the workpieces; and
control means for selecting one of the plurality of candidate holding points based on the information about the workpiece acquired by the second information acquisition means, and controlling the holding means so that the holding means holds the workpiece at the selected candidate holding point.

In this aspect, the information about the workpiece may be information about presence/absence of the other workpiece, and
the control means may select, based on the information about the presence/absence of the other workpiece, from among the plurality of candidate holding points, a candidate holding point from which no other workpiece is present within the predetermined range.

In this aspect, the second information acquisition means may generate information indicating that there is another workpiece within the predetermined range when the second information acquisition means determines, based on the 3D information of the plurality of workpieces acquired by the first information acquisition means, that there is a maximum point other than the candidate holding point within the predetermined range from each of the candidate holding points on the workpieces, the maximum point being a point having a maximum coordinate value in a height direction.

In this aspect, the second information acquisition means may generate information indicating that there is another workpiece within the predetermined range when, as the 3D information of the workpiece within the predetermined range is cut in parallel to a horizontal plane orthogonal to a height direction at a plurality of different height positions, there is a cutting plane that is discontinuous at at least one of the height positions.

In this aspect, the control means may select one candidate holding point from among a plurality of candidate holding points from each of which no other workpiece is present within the predetermined range based on a distance between another workpiece located outside the predetermined range and the candidate holding point.

In this aspect, the information about the workpiece may be distance information about a distance between each of the candidate holding points and another workpiece within the predetermined range therefrom, and
the control means may select one candidate holding point from among the plurality of candidate holding points based on the distance information.

In this aspect, the control means may select, based on the distance information, one candidate holding point from among the plurality of candidate holding points, the one candidate holding point being a candidate holding point of which an integral value of the distance between the candidate holding point and another workpiece within the predetermined range therefrom is the largest.

In this aspect, the candidate calculation means may calculate, based on the 3D information of the plurality of workpieces acquired by the first information acquisition means, a maximum point of the workpiece of which a coordinate value in the height direction is maximum as the candidate holding point.

In this aspect, the candidate calculation means may use, among the candidate holding points that are maximum points, a maximum point having a predetermined area or larger as the candidate holding point.

In order to achieve the above-described object, another exemplary aspect may be a workpiece holding method including:
  acquiring 3D information of a plurality of workpieces placed in a 3D space;
  calculating, based on the acquired 3D information of the plurality of workpieces, a plurality of candidate holding points, the plurality of candidate holding points being, when holding means attracts and holds each of the workpieces in turn, candidates for a holding point of that workpiece;
  acquiring information about each of other workpieces present within a predetermined range from each of the candidate holding points on the workpieces; and
  selecting one of the plurality of candidate holding points based on the information about the acquired workpiece, and controlling the holding means so that the holding means holds the workpiece at the selected candidate holding point.

In order to achieve the above-described object, another exemplary aspect may be a program for causing a computer to perform:
  a process of acquiring 3D information of a plurality of workpieces placed in a 3D space;
  a process of calculating, based on the acquired 3D information of the plurality of workpieces, a plurality of candidate holding points, the plurality of candidate holding points being, when holding means attracts and holds each of the workpieces in turn, candidates for a holding point of that workpiece;
  a process of acquiring information about each of other workpieces present within a predetermined range from each of the candidate holding points on the workpieces; and
  a process of selecting one of the plurality of candidate holding points based on the information about the acquired workpiece, and controlling the holding means so that the holding means holds the workpiece at the selected candidate holding point.

In order to achieve the above-described object, another exemplary aspect may be a control apparatus including:
  first information acquisition means for acquiring 3D information of a plurality of workpieces placed in a 3D space;
  candidate calculation means for calculating, based on the 3D information of the plurality of workpieces acquired by the first information acquisition means, a plurality of candidate holding points, the plurality of candidate holding points being, when holding means holds each of the workpieces, candidates for a holding point of that workpiece;
  second information acquisition means for acquiring information about each of other workpieces present within a predetermined range from each of the candidate holding points on the workpieces; and
  control means for selecting one of the plurality of candidate holding points based on the information about the workpiece acquired by the second information acquisition means, and controlling the holding means so that the holding means holds the workpiece at the selected candidate holding point.

According to the present disclosure, it is possible to provide a workpiece holding apparatus, a workpiece holding method, a program, and a control apparatus capable of preventing, when a workpiece is attracted and held, other workpieces from being attracted and held together with the workpiece to be attracted and held.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

First Embodiment

Figure 1:
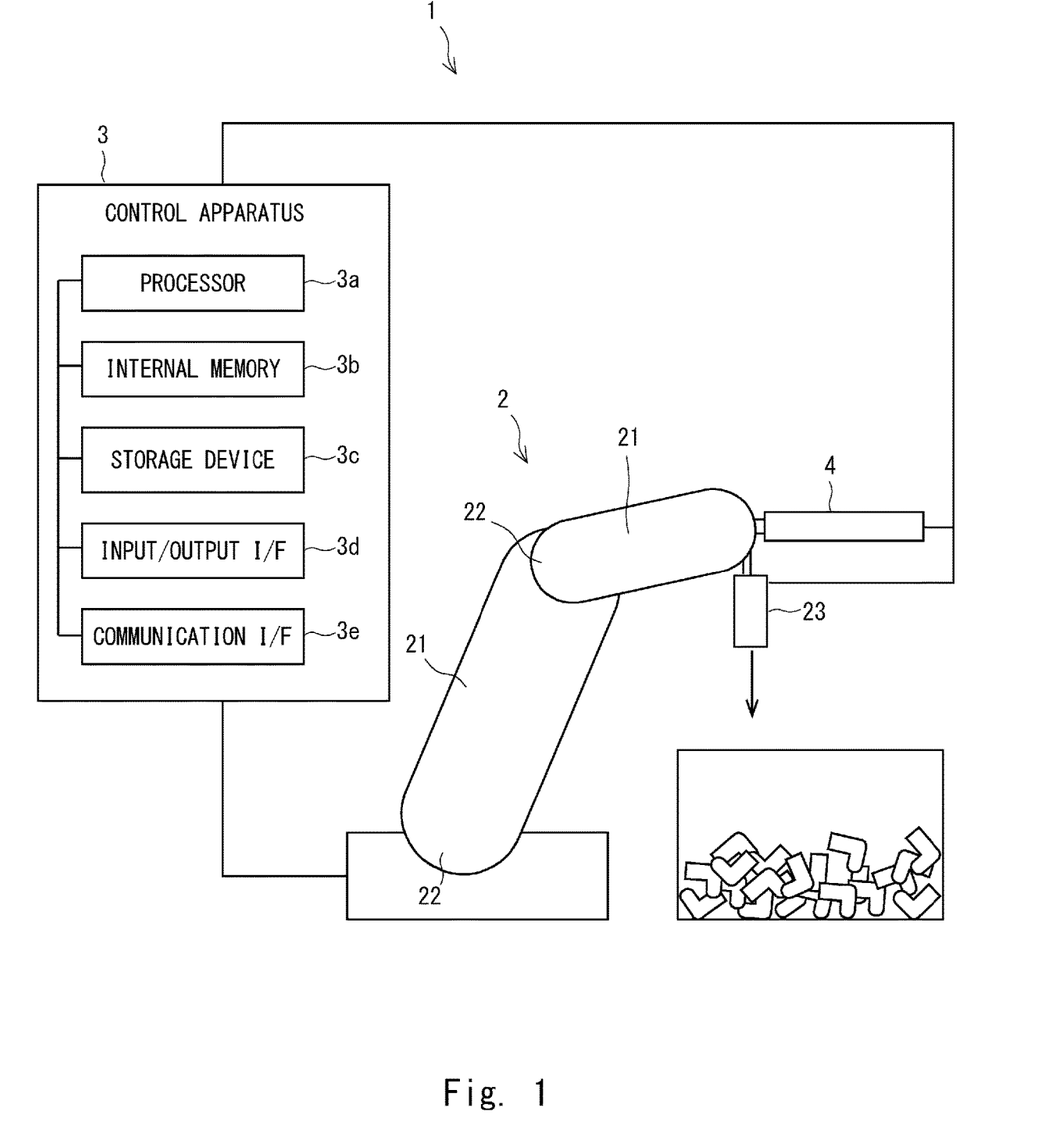
FIG. 1 is a block diagram showing a schematic system configuration of a workpiece holding apparatus according to an embodiment.

An embodiment according to the present disclosure will be described hereinafter with reference to the drawings. FIG. 1 is a block diagram showing a schematic system configuration of a workpiece holding apparatus according to this embodiment. A workpiece holding apparatus 1 according to this embodiment can attract (e.g., suck), hold, and move each workpiece in turn from among a plurality of workpieces placed in a 3D (three-dimensional) space. The plurality of workpieces are components or the like that are, for example, contained in a box or stacked on a flat surface in a random manner. Note that the plurality of workpieces includes components having arbitrary shapes, such as a planar shape and a three-dimensional shape.

The workpiece holding apparatus 1 according to this embodiment includes a robot arm 2, a control apparatus 3, and a 3D vision sensor 4.

The robot arm 2 is a specific example of the holding means. For example, the robot arm 2 is configured as an articulated arm including a plurality of links 21, joint parts (such as a wrist joint, an elbow joint, and a shoulder joint) 22 each of which rotatably connects a corresponding two of the links 21 to each other, and an end effector 23 that is provided at the tip of the arm and attracts (e.g., sucks) and holds a workpiece.

Each of the joint parts 22 is provided with a rotation sensor, such as an encoder, that detects the rotation of that joint part 22, an actuator, such as a servomotor, that drives that joint part 22, and a force sensor that detects an operational force of that joint part 22. The force sensor is, for example, a torque sensor that detects the torque of the joint part 22. Each of the joint parts 22 is provided with a speed-reducing mechanism or the like.

The end effector 23 attracts (e.g., sucks) a workpiece in a non-contact manner by using an attractive force (e.g., a sucking force) such as a magnetic force or an air pressure, and holds the attracted workpiece. The end effector 23 is configured to, for example, electromagnetically attract a workpiece by generating a magnetic force, and release the electromagnetically-attracted workpiece by stopping the generating of the magnetic force.

The control apparatus 3 performs various arithmetic processes and control processes for the robot arm 2. For example, the control apparatus 3 uses a processor 3a such as a CPU (Central Processing Unit) or a GPU (Graphics Processing Unit), an internal memory 3b such as a RAM (Random Access Memory) and a ROM (Read Only Memory), a storage device 3c such as an HDD (Hard Disk Drive) or an SSD (Solid State Drive), an input/output I/F (InterFace) 3d for connecting a peripheral device such as a display, and a communication I/F 3e for communicating with an apparatus located outside the control apparatus.

The 3D vision sensor 4 is a specific example of the first information acquisition means. The 3D vision sensor 4 acquires 3D information of each of a plurality of workpieces. The 3D information of each workpiece includes information of the shape of the workpiece, the position (such as 3D coordinates) thereof, the posture thereof, and the like.

The 3D vision sensor 4 is disposed, for example, in the end effector 23 or the link 21 (e.g., one of the links 21) of the robot arm 2. The 3D vision sensor 4 is composed of a camera, a laser sensor, or the like. The 3D vision sensor 4 outputs acquired 3D information of a workpiece to the control apparatus 3.

Figure 2:
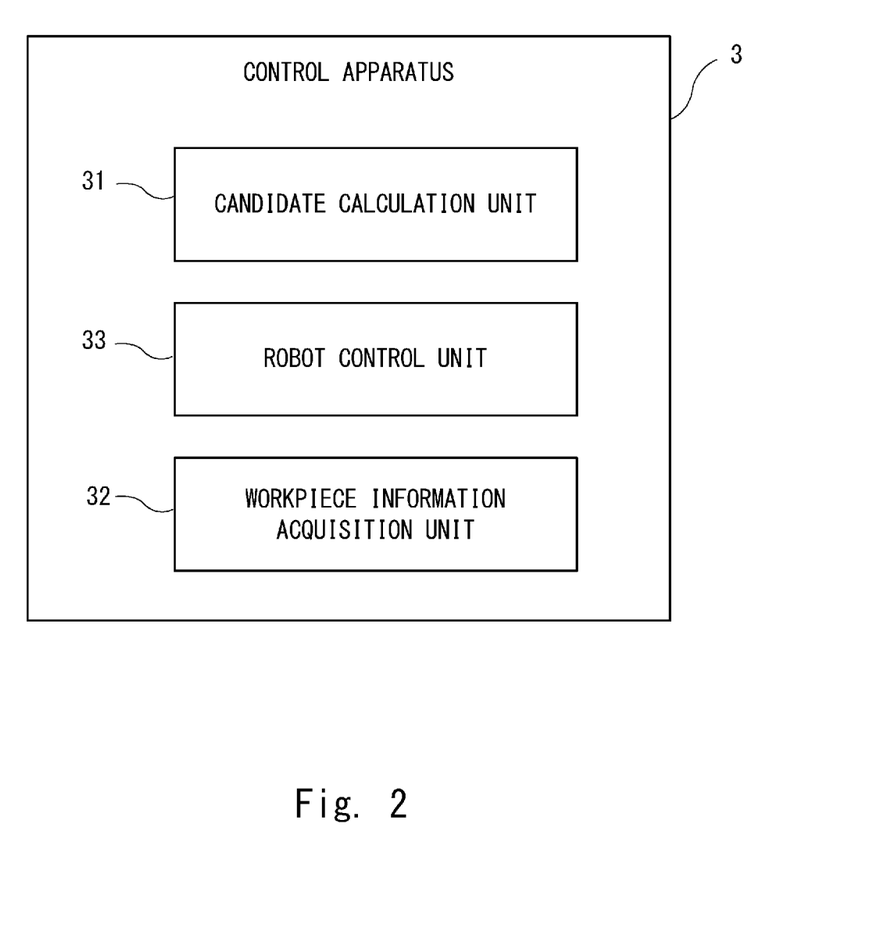
FIG. 2 is a block diagram showing a schematic system configuration of a control apparatus according to an embodiment.

FIG. 2 is a block diagram showing a schematic system configuration of a control apparatus according to this embodiment. The control apparatus 3 according to this embodiment includes a candidate calculation unit 31, a workpiece information acquisition unit 32, and a robot control unit 33.

The candidate calculation unit 31 is a specific example of the candidate calculation means. The candidate calculation unit 31 calculates, based on the 3D information of the workpiece acquired by the 3D vision sensor 4, a plurality of candidate holding points, which are, when the end effector 23 of the robot arm 2 attracts (e.g., sucks) and holds a workpiece, candidates for the holding point (the attracting point (e.g., the sucking point)) of the workpiece.

Figure 3:
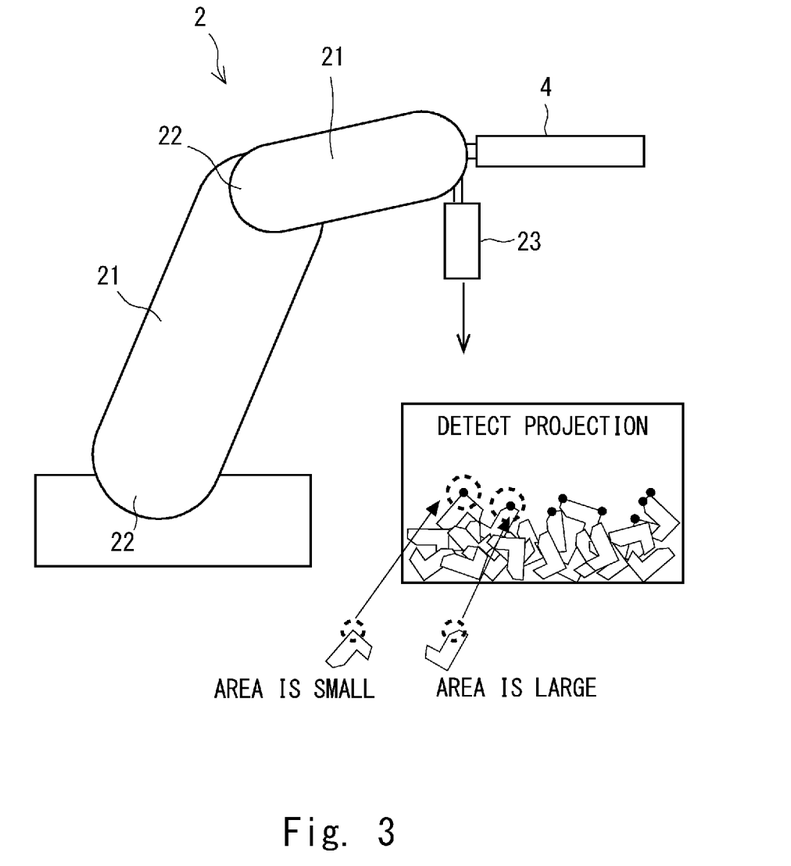
FIG. 3 shows a projecting part of a workpiece.

For example, the candidate calculation unit 31 calculates depth information indicating the height position of each workpiece based on the 3D information of the workpiece acquired by the 3D vision sensor 4. The candidate calculation unit 31 detects a projecting part projecting in the height direction based on the calculated depth information of each workpiece (FIG. 3).

For example, the candidate calculation unit 31 defines, based on the calculated depth information, heights of points higher than or equal to a predetermined height as 1 and height of points lower than the predetermined height as 0, and thereby binarizes the heights of points. Then, the candidate calculation unit 31 detects a point of which the height is 1 as a projecting part. The candidate calculation unit 31 may use the projecting part detected as described above as a candidate holding point. In this way, it is possible to use a projecting part which the end effector 23 can easily attract and hold as a candidate holding point.

Further, the candidate calculation unit 31 may select, from among a plurality of projecting parts detected as described above, a projecting part of which the area (i.e., the size) of the end face which the end effector 23 will attract is larger than or equal to a threshold as a candidate holding point. In this way, it is possible to narrow down the projecting parts which the end effector 23 can easily attract and hold to one (or those) of which the area of the part to be attracted is large and which the end effector 23 can therefore attract and hold more easily as a candidate holding point(s).

The candidate calculation unit 31 may calculate, based on the 3D information of the workpiece acquired by the 3D vision sensor 4, a maximum point of the workpiece at which the coordinate of the workpiece in the height direction is maximum as a candidate holding point. In this way, it is possible to use the maximum point which significantly projects in the height direction and hence the end effector 23 can easily attract and hold as the candidate holding point.

Further, the candidate calculation unit 31 may calculate, from among the candidate holding points that are the above-described maximum points, a maximum point having a predetermined area or larger as a candidate holding point. In this way, it is possible to narrow down the maximum points which the end effector 23 can easily attract and hold to one (or those) of which the area of the part to be attracted is large and which the end effector 23 can therefore attract and hold more easily as a candidate holding point(s).

Note that the candidate calculation unit 31 may further determine, based on the 3D information of the workpiece acquired by the 3D vision sensor 4, whether or not it is possible to hold the workpiece at each of the candidate holding points which has been narrowed down as described above. The candidate calculation unit 31 may determine whether or not it is possible to hold the workpiece at each of the candidate holding points by determining whether or not interference with another workpiece will occur when the workpiece is held at that candidate holding point. The candidate calculation unit 31 may use candidate holding points at each of which it has determined to be able to hold the workpiece as a plurality of final candidate holding points.

The candidate calculation unit 31 outputs the plurality of candidate holding points calculated as described above to the robot control unit 33.

It should be noted that, in a conventional workpiece holding apparatus, there is a risk that when it attracts and holds a workpiece at a candidate holding point, it could also attract and hold another workpiece near the candidate holding point together with the workpiece to be attracted and held.

To cope with this problem, the workpiece holding apparatus 1 according to this embodiment acquires information about each of other workpieces present within a predetermined range from each of the candidate holding points on the workpieces to be held, selects one of a plurality of candidate holding points based on the acquired information about the other workpieces, and controls the robot arm 2 so that the robot arm 2 holds the workpiece at the selected candidate holding point.

In this way, it is possible to select, in consideration of the states of other workpieces near each of the candidate holding points on the workpieces to be held, a candidate holding point at which any of the other workpieces is less likely to be attracted together with the workpiece to be held, and thereby to hold the workpiece to be held at that candidate holding point. Therefore, it is possible to prevent, when a workpiece is attracted and held, other workpieces from being attracted and held together with the workpiece to be attracted and held.

The workpiece information acquisition unit 32 is a specific example of the second information acquisition means. The workpiece information acquisition unit 32 acquires information about other workpieces present within a predetermined range from each of the candidate holding points on the workpieces (hereinafter also referred to as "other workpiece information").

The predetermined range is set in advance in the workpiece information acquisition unit 32. The predetermined range is a range in which an object or the like is affected by the attractive force (e.g., sucking force) (such as a magnetic force) of the end effector 23, and is set based on the attractive force. The predetermined range is set, for example, by taking a buffer zone into consideration in the height of the workpiece to be attracted at which the workpiece to be attracted or the other workpiece is attracted by the end effector 23 when the end effector 23 is moved closer to the candidate holding point on the workpiece.

The other workpiece information is, for example, information indicating whether or not another workpiece is present (i.e., indicating the presence/absence of another workpiece) within the predetermined range.

The workpiece information acquisition unit 32 may determine, based on the 3D information of a plurality of workpieces acquired by the 3D vision sensor 4, whether or not there is a maximum point which is not the candidate holding point on the workpiece and of which the coordinate in the height direction is maximum within the predetermined range from each of the candidate holding points on the workpieces. When the workpiece information acquisition unit 32 determines that there is a maximum point other than the candidate holding point within the predetermined range, it may generate information indicating that there is another workpiece within the predetermined range.

When there is another workpiece within the predetermined range, this workpiece has a maximum point that projects in the height direction. Therefore, it is possible to easily detect the other workpiece within the predetermined range by detecting the maximum point as described above.

Further, the workpiece information acquisition unit 32 may also determine whether or not, when the 3D information of the workpiece within the predetermined range is cut in parallel to a horizontal plane orthogonal to the height direction at a plurality of different height positions, there is a cutting plane that is discontinuous at at least one of the height positions. When the workpiece information acquisition unit 32 determines that there is a cutting plane that is discontinuous at at least one of the height positions, it may generate information indicating that there is another workpiece within the predetermined range.

Figure 4:
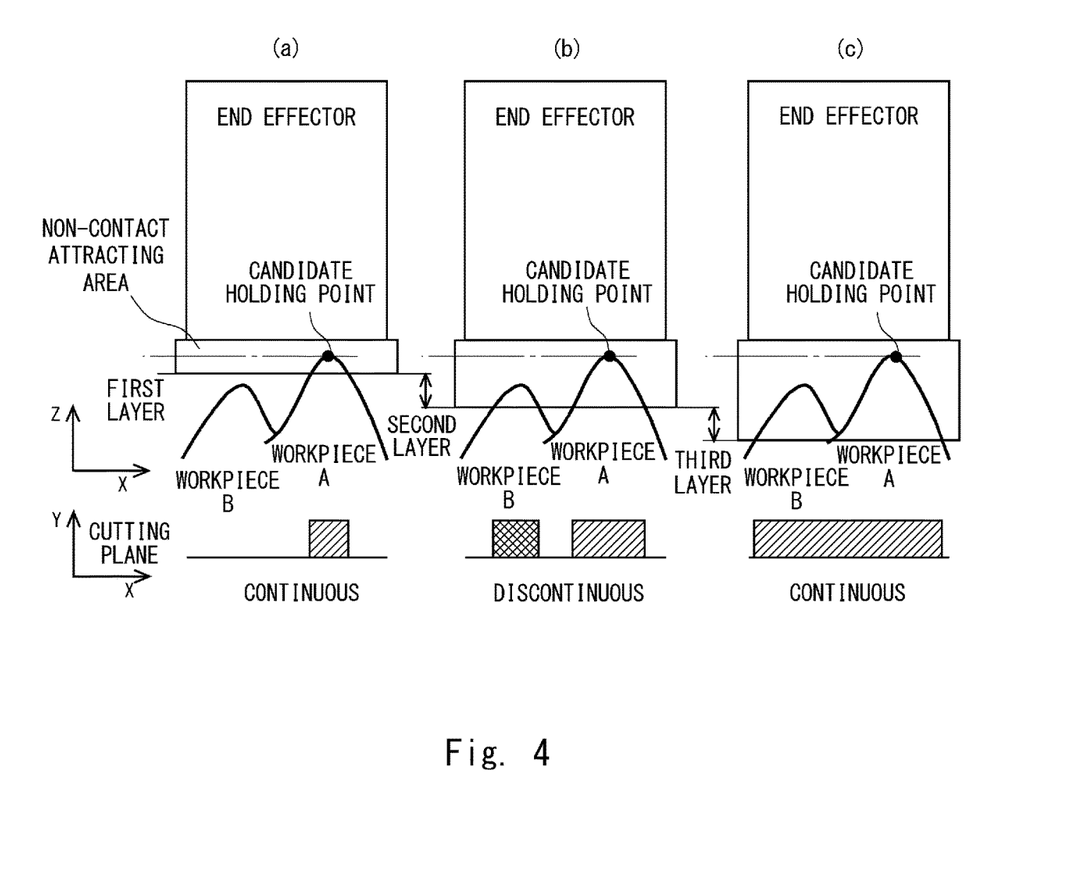
FIG. 4 is a diagram for explaining a method for detecting other workpieces within a predetermined range.

When there is another workpiece in the predetermined range, it means that there is a peak of the other workpiece in the height direction (the Z-direction) other than the peak of the workpiece including the candidate holding point. Therefore, when the peak of the workpiece is cut in parallel to the horizontal plane orthogonal to the height direction, the cutting plane will be discontinuous. It is possible to easily and accurately detect another workpiece(s) present within the predetermined range by detecting such discontinuous cutting plane.

For example, as shown in FIG. 4(*a*), when a workpiece is cut at the height position of a first layer, only the peak of a workpiece A including the candidate holding point is cut, so the cutting plane includes only the cutting plane of the workpiece A and is continuous.

Next, when the workpiece is cut at the height of a second layer lower than the first layer, the workpiece is cut at the middle of the peak of the workpiece A including the candidate holding point and at the middle of the peak of another workpiece B. Therefore, the cutting plane includes the cutting plane of the workpiece A and the cutting plane of the other workpiece B, so it is discontinuous.

Next, when the workpiece is cut at the height of a third layer lower than the second layer, the workpiece is cut at the middle of the peak of the workpiece A including the candidate holding point and at the middle of the peak of the other workpiece B. Therefore, the cutting plane includes the cutting plane of the workpiece A and the cutting plane of the other workpiece B. However, since the workpiece A and the other workpiece B overlap each other, the cutting plane is continuous.

As described above, when there is another workpiece within the predetermined range, when the workpiece is successively cut in parallel to the horizontal plane orthogonal to the height direction while changing the height position of the cutting, there is a discontinuous cutting plane at at least one of the height positions. By detecting the above-described discontinuous cutting plane, it is possible to easily detect another workpiece(s) within the predetermined range in a simple manner.

Note that the number of cuttings and the interval between cuttings can be arbitrarily set. For example, when the number of cuttings is increased and the interval between cuttings is decreased, the accuracy of the above-described determination of the presence/absence of another workpiece(s) improves, but the amount of calculation increases accordingly. Therefore, it is preferred to determine the optimum number of cuttings and the interval between cuttings while taking the trade-off between the accuracy of the above-described determination of the presence/absence of another workpiece(s) and the amount of calculation therefor into consideration.

The workpiece information acquisition unit 32 outputs the workpiece information indicating the presence/absence of another workpiece acquired as described above to the robot control unit 33.

The robot control unit 33 is a specific example of the control means. The robot control unit 33 controls the movement (e.g., the action) performed by the robot arm 2. For example, the robot control unit 33 performs feedback control for the robot arm 2 by controlling the actuator of each of the joint parts based on the rotation information (i.e., information about the rotation angle and the like) provided from the rotation sensor of that joint part and the operational force provided from the force sensor. Further, the robot control unit 33 also controls the attraction (e.g., sucking) and release of a workpiece by the end effector 23 by controlling the attractive force of the end effector 23. In this way, the robot control unit 33 can hold and move the workpiece by controlling the robot arm 2.

The robot control unit 33 selects one candidate holding point from among a plurality of candidate holding points calculated by the candidate calculation unit 31.

The robot control unit 33 controls the robot arm 2 based on the 3D information of the workpiece acquired by the 3D vision sensor 4 so that the end effector 23 of the robot arm 2 holds the workpiece at the candidate holding point.

The robot control unit 33 selects, based on workpiece information indicating the presence/absence of another workpiece(s) provided from the workpiece information acquisition unit 32, from among a plurality of candidate holding points, a candidate holding point from which no other workpiece is present within the predetermined range. In this way, it is possible to select a candidate holding point of which no other workpiece is present in the vicinity, thus making it possible, by attracting and holding the workpiece at the selected candidate holding point, to prevent other workpieces from being attracted and held together with the workpiece to be attracted and held.

Note that when there are a plurality of candidate holding points from which no other workpiece is present within the predetermined range, the robot control unit 33 narrows down these candidate holding points. For example, the robot control unit 33 selects, from among the plurality of candidate holding points from which no other workpiece is present within the predetermined range, one candidate holding point based on the distance between another workpiece(s) located outside the predetermined range and the candidate holding point. In this way, it is possible to select an optimum candidate holding point at which it is possible to attract and hold only the workpiece to be held while any of the other workpieces located outside the predetermined range is less likely to be attracted together with the workpiece to be held.

The robot control unit 33 may select, from among a plurality of candidate holding points from which no other workpiece is present within the predetermined range, a candidate holding point the distance from which to the other workpiece located outside the predetermined range is the largest.

In this way, it is possible, after narrowing down the candidate holding points to those from which no other workpiece is present within the predetermined range, to further select, from these narrowed-down candidate holding points, a candidate holding point which is the farthest from the other workpiece located outside the predetermined range and for which it is least likely to attract the other workpiece located outside the predetermined range. Therefore, it is possible to prevent more reliably, when a workpiece is attracted and held at its candidate holding point, any of other workpieces from being attracted and held together with the workpiece to be attracted and held.

For example, the robot control unit 33 selects one candidate holding point by using an evaluation function for the distance between a candidate holding point(s) and another workpiece(s) located outside the predetermined range therefrom.

This evaluation function may be defined as the reciprocal of the distance between the candidate holding point and the other workpiece located outside the predetermined range therefrom, so that the larger the distance between the candidate holding point and the other workpiece located outside the predetermined range is, the smaller the evaluation value becomes.

The aforementioned distance between the candidate holding point and the other workpiece located outside the predetermined range therefrom is, for example, an integral value of the distance between the attracting and holding surface of the end effector 23 (the lower surface of the tool) and the other workpiece located outside the predetermined range when the workpiece to be held is held at the candidate holding point. The above-described distance is calculated because when the attracting and holding surface of the end effector 23 is moved closer to the candidate holding point on the workpiece to be held in order to attract and hold the workpiece at the candidate holding point, other workpieces are affected by the attractive force in such a manner that the closer the other workpiece is to the attracting and holding surface of the end effector 23, the more the other workpiece is affected by the attractive force.

Therefore, it is preferred to select a candidate holding point for which the integral value of the distance between that candidate holding point and the other workpiece located outside the predetermined range, i.e., the distance between the attracting and holding surface of the end effector 23 and the other workpiece located outside the predetermined range, is the largest, and the above-described evaluation value is small.

For example, the evaluation function J is defined as shown below.

$$J = \frac{1}{|\Omega_0 \cup \Omega_t|} \sum_{(u,v) \notin \Omega_0 \cup \Omega_t} \frac{1}{\max(d(u,v) - d_t, \Delta)} \quad \text{[Expression 1]}$$

$$\Omega_0 = \{(u, v); d(u, v) = 0\}$$

(u, v) represents the position of a point (a pixel) in a depth image. u represents a horizontal coordinate and v represents a vertical coordinate. For example, in the case of an image of 640×480 pixels, u and v are expressed as "0≤u<640" and "0≤v<" 480, respectively.

d(u, v) is a value (a depth) at the point (u, v) in the depth image. Specifically, the depth is a distance from the camera (the 3D vision sensor 4) to the object to be photographed. Further, its unit is meters, and has a non-negative value. However, a value "0" is a special value and means that the camera was not able to acquire the depth of the object to be photographed at the place thereof.

Among various reasons for not being able to acquire the depth, the most common one is that light emitted from the light source provided in the camera is blocked by an obstacle and is not returned because the direction in which the light source emits the light and the direction in which the light that is incident on the object, reflected thereon, and returned to the sensor of the camera differ from each other.

$d_t$ is a depth at the candidate holding point that is currently of interest. D is a distance within which the attractive force (e.g., the sucking force) affects downward from the candidate holding point. $\Delta$ is the interval between cuttings at which the threshold for the height of the cutting, which is set to binarize the depth image, is changed from $d_t$ to $d_t+D$.

$\Omega_0$ is a set of points in the depth image at each of which the depth was not be able to be obtained as described above. $\Omega_t$ is a set of points which are located in the same area as the candidate holding point (i.e., are located within a predetermined area) and of each of which the depth is smaller than dt+D (i.e., closer to the camera), i.e., of each of which a relation "d(u, v)<dt+D" holds.

Note that in the above evaluation function J, the effect at each effective pixel is normalized by dividing by the total number of all the pixels except for pixels at the peak containing the candidate holding point and those at the hole at which the depth is zero (depth=0).

As described above, the robot control unit 33 calculates the evaluation value, which is calculated by adding up all the points that are not located in the same area as the candidate holding point of current interest (i.e., are located outside the predetermined area) and satisfy the relation "0<d(u, v)<dt+D" by using the evaluation function J.

Figure 5:
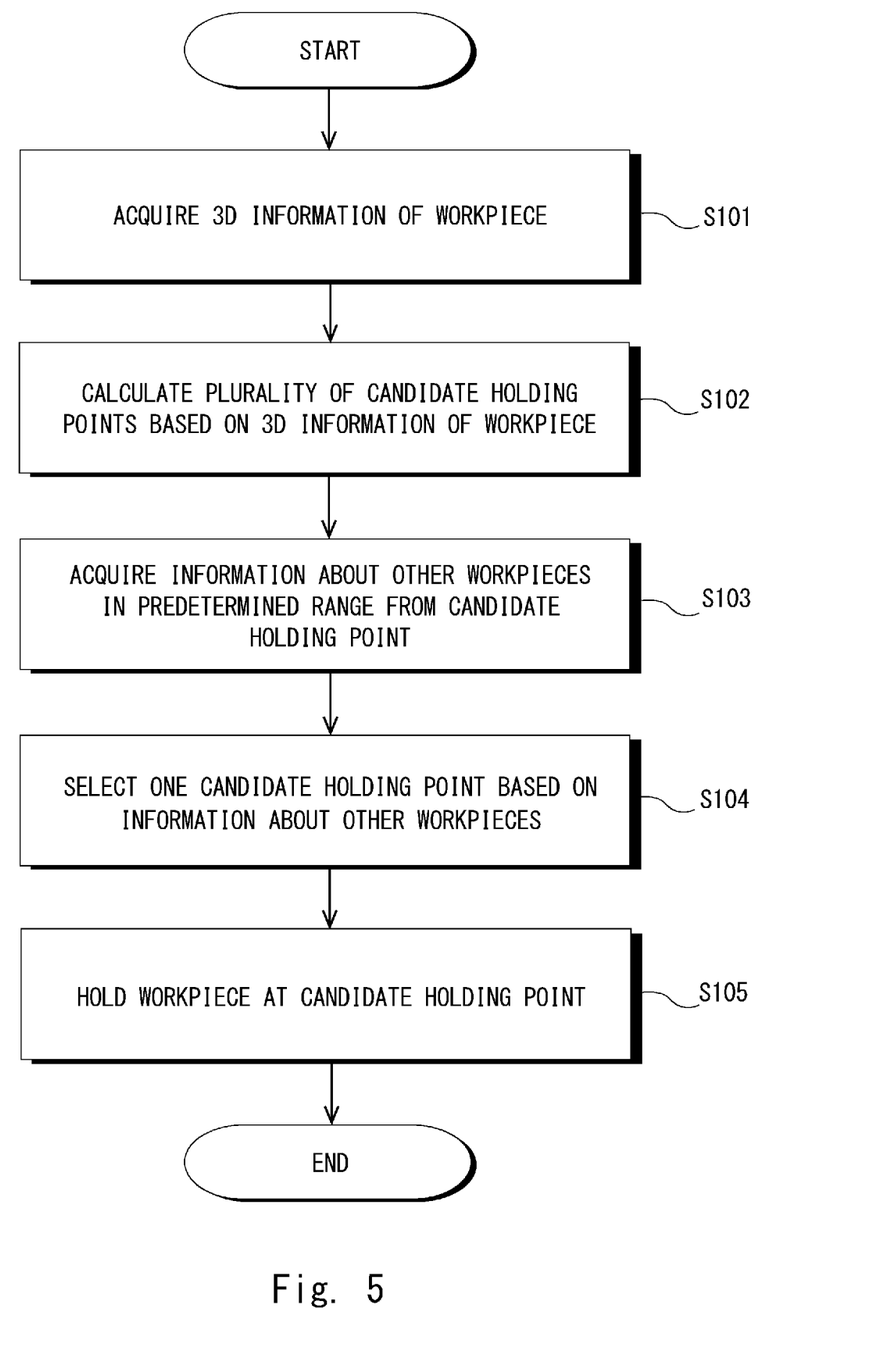
FIG. 5 is a flowchart showing a flow of a method for holding a workpiece according to an embodiment.

Next, a method for holding a workpiece according to this embodiment will be described. FIG. 5 is a flowchart showing a flow of a method for holding a workpiece according to this embodiment. Note that the control process shown in FIG. 5 is repeated at intervals of a predetermined time.

The 3D vision sensor 4 acquires 3D information of a workpiece and outputs the acquired 3D information to the control apparatus 3 (Step S101).

The candidate calculation unit 31 of the control apparatus 3 calculates a plurality of candidate holding points for the end effector 23 of the robot hand based on the 3D information of the workpiece acquired by the 3D vision sensor 4 (Step S102).

The workpiece information acquisition unit 32 acquires other workpiece information about each of other workpieces present within a predetermined range from each of the candidate holding points on the workpieces calculated by the candidate calculation unit 31 (Step S103).

The robot control unit 33 selects one candidate holding point from among a plurality of candidate holding points based on the other workpiece information provided from the workpiece information acquisition unit 32 (Step S104).

The robot control unit 33 controls the robot arm 2 so that the end effector 23 of the robot arm 2 holds the workpiece at the selected candidate holding point (Step S105).

As described above, the workpiece holding apparatus 1 according to this embodiment acquires information about each of other workpieces present within the predetermined range from each of the candidate holding points on the workpieces, selects one of the plurality of candidate holding points based on the acquired information about the other workpieces, and controls the robot arm 2 so that the robot arm 2 holds the workpiece at the selected candidate holding point.

In this way, it is possible to select, in consideration of the other workpieces near each of the candidate holding points on the workpieces to be attracted and held, a candidate holding point at which any of the other workpieces is less likely to be attracted and held together with the workpiece to be attracted and held, and thereby to attract and hold the workpiece to be attracted and held at that candidate holding point. Therefore, it is possible to prevent, when a workpiece is attracted and held, other workpieces from being attracted and held together with the workpiece to be attracted and held.

Second Embodiment

In this embodiment, the workpiece information may be distance information about a distance between each candidate holding point and another workpiece present within a predetermined range therefrom. The workpiece information acquisition unit 32 acquires distance information about a distance between each candidate holding point and another workpiece present within a predetermined range therefrom based on 3D information of a plurality of workpieces acquired by the 3D vision sensor 4.

The robot control unit 33 selects one candidate holding point from among the plurality of candidate holding points calculated by the candidate calculation unit 31 based on the distance information about a distance between each candidate holding point and another workpiece present within the predetermined range therefrom acquired by the workpiece information acquisition unit 32.

In this way, it is possible to select, in consideration of the distance between each of the candidate holding points on the workpieces and another workpiece near that candidate holding point, a candidate holding point at which any of the other workpieces is less likely to be attracted and held together with the workpiece to be attracted and held, and thereby to attract and hold the workpiece to be attracted and held at that candidate holding point. Therefore, it is possible to prevent, when a workpiece is attracted and held, other workpieces from being attracted and held together with the workpiece to be attracted and held.

For example, the robot control unit 33 may select, based on the distance information between each of the candidate holding points and another workpiece present within the predetermined range obtained by the workpiece information acquisition unit 32, a candidate holding point of which an integral value of the distance between the candidate holding point and the other workpiece present within the predetermined range therefrom is the largest from among the plurality of candidate holding points calculated by the candidate calculation unit 31. In this way, it is possible to select a candidate holding point on a workpiece from which the distance to the other workpiece near that candidate holding point is the largest and at which any of the other workpieces is less likely to be attracted together with the workpiece to be attracted.

For example, the robot control unit 33 may select a candidate holding point for which the evaluation value of the above-described evaluation function J for the distance between the candidate holding point and the other workpiece present within the predetermined range is the smallest.

The present disclosure may also be implemented, for example, by having a processor execute a computer program and thereby perform the processes shown in FIG. 5.

The program includes instructions (or software codes) that, when loaded into a computer, cause the computer to perform one or more of the functions described in the embodiments. The program may be stored in a non-transitory computer readable medium or a tangible storage medium. By way of example, and not a limitation, non-transitory computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

The program may be provided to a computer using any type of transitory computer readable media. Examples of transitory computer readable media include electric signals, optical signals, and electromagnetic waves. Transitory computer readable media can provide the program to a computer through a wired communication line (e.g., electric wires, and optical fibers) or a wireless communication line.

Each of the units constituting the control apparatus 3 according to any of the above-described embodiments is, in addition to being able to be implemented by the program, able to be partially or entirely implemented by dedicated hardware such as an ASIC (Application Specific Integrated Circuit) or an FPGA (Field-Programmable Gate Array).

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:
1. A workpiece holding apparatus comprising:
an arm that is configured to attract and hold each workpiece in turn from among a plurality of workpieces placed in a 3D (three-dimensional) space;
a first sensor that is configured to acquire 3D information of the plurality of workpieces; and
a processor that is configured to:
calculate, based on the 3D information of the plurality of workpieces acquired by the first sensor, a plurality of candidate holding points, the plurality of candi- date holding points being, when the arm holds each of the workpieces in turn, candidates for a holding point of that workpiece;

acquire information about each of other workpieces present within a predetermined range from each of the candidate holding points on the workpieces; and select one of the plurality of candidate holding points based on the information about the workpiece acquired, and controlling the arm so that the arm holds the workpiece at the selected candidate holding point, wherein:

the information about each of the other workpieces is information about presence/absence of the other workpieces, the processor is configured to select, based on the information about the presence/absence of the other workpieces, from among the plurality of candidate holding points, a candidate holding point from which no other workpiece is present within the predetermined range, the processor is configured to generate information indicating that there is another workpiece within the predetermined range when, as the 3D information of the workpiece within the predetermined range is cut in parallel to a horizontal plane orthogonal to a height direction at a plurality of different height positions, there is a cutting plane that is discontinuous at at least one of the height positions, and a number of cuttings and an interval between the cuttings are determined based on an accuracy of a determination of the presence/absence of the another workpiece and an amount of calculation therefore.

2. The workpiece holding apparatus according to claim 1, wherein the processor is configured to generate information indicating that there is another workpiece within the predetermined range when the processor determines, based on the 3D information of the plurality of workpieces acquired by the first sensor, that there is a maximum point other than the candidate holding point within the predetermined range from each of the candidate holding points on the workpieces, the maximum point being a point having a maximum coordinate value in a height direction.

3. The workpiece holding apparatus according to claim 1, wherein the processor is configured to select one candidate holding point from among a plurality of candidate holding points from each of which no other workpiece is present within the predetermined range based on a distance between another workpiece located outside the predetermined range and the candidate holding point.

4. The workpiece holding apparatus according to claim 1, wherein
the information about the workpiece is distance information about a distance between each of the candidate holding points and another workpiece within the predetermined range therefrom, and
the processor is configured to select one candidate holding point from among the plurality of candidate holding points based on the distance information.

5. The workpiece holding apparatus according to claim 4, wherein the processor is configured to select, based on the distance information, one candidate holding point from among the plurality of candidate holding points, the one candidate holding point being a candidate holding point of which an integral value of the distance between the candidate holding point and another workpiece within the predetermined range therefrom is the largest.

6. The workpiece holding apparatus according to claim 1, wherein the processor is configured to calculate, based on the 3D information of the plurality of workpieces acquired by the first sensor, a maximum point of the workpiece of which a coordinate value in the height direction is maximum as the candidate holding point.

7. The workpiece holding apparatus according to claim 6, wherein the processor is configured to use, from among the candidate holding points that are maximum points, a maximum point having a predetermined area or larger as the candidate holding point.

8. A method for holding a workpiece comprising:
acquiring 3D information of a plurality of workpieces placed in a 3D space;
calculating, based on the acquired 3D information of the plurality of workpieces, a plurality of candidate holding points, the plurality of candidate holding points being, when an arm attracts and holds each of the workpieces in turn, candidates for a holding point of that workpiece;
acquiring information about each of other workpieces present within a predetermined range from each of the candidate holding points on the workpieces;
selecting one of the plurality of candidate holding points based on the information about the acquired workpiece, and controlling the arm so that the arm holds the workpiece at the selected candidate holding point, wherein the information about each of the other workpieces is information about presence/absence of the other workpieces;
selecting, based on the information about the presence/absence of the other workpieces, from among the plurality of candidate holding points, a candidate holding point from which no other workpiece is present within the predetermined range; and
generating information indicating that there is another workpiece within the predetermined range when, as the 3D information of the workpiece within the predetermined range is cut in parallel to a horizontal plane orthogonal to a height direction at a plurality of different height positions, there is a cutting plane that is discontinuous at at least one of the height positions,
wherein a number of cuttings and an interval between the cuttings are determined based on an accuracy of a determination of the presence/absence of the another workpiece and an amount of calculation therefore.

9. A non-transitory computer readable medium storing a program for causing a computer to perform:
a process of acquiring 3D information of a plurality of workpieces placed in a 3D space;
a process of calculating, based on the acquired 3D information of the plurality of workpieces, a plurality of candidate holding points, the plurality of candidate holding points being, when an arm attracts and holds each of the workpieces in turn, candidates for a holding point of that workpiece;
a process of acquiring information about each of other workpieces present within a predetermined range from each of the candidate holding points on the workpieces;
a process of selecting one of the plurality of candidate holding points based on the information about the acquired workpiece, and controlling the arm so that the arm holds the workpiece at the selected candidate holding point, wherein the information about each of the other workpieces is information about presence/absence of the other workpieces;
a process of selecting, based on the information about the presence/absence of the other workpieces, from among the plurality of candidate holding points, a candidate holding point from which no other workpiece is present within the predetermined range; and a process of generating information indicating that there is another workpiece within the predetermined range when, as the 3D information of the workpiece within the predetermined range is cut in parallel to a horizontal plane orthogonal to a height direction at a plurality of different height positions, there is a cutting plane that is discontinuous at at least one of the height positions, wherein a number of cuttings and an interval between the cuttings are determined based on an accuracy of a determination of the presence/absence of the another workpiece and an amount of calculation therefore.

10. A control apparatus comprising:

a first sensor for acquiring 3D information of a plurality of workpieces placed in a 3D space; and a processor that is configured to:

calculate, based on the 3D information of the plurality of workpieces acquired by the first sensor, a plurality of candidate holding points, the plurality of candidate holding points being, when an arm holds each of the workpieces, candidates for a holding point of that workpiece;

acquire information about each of other workpieces present within a predetermined range from each of the candidate holding points on the workpieces; and select one of the plurality of candidate holding points based on the information about the workpiece acquired, and controlling the arm so that the arm holds the workpiece at the selected candidate holding point, wherein:

the information about each of the other workpieces is information about presence/absence of the other workpieces, the processor is configured to select, based on the information about the presence/absence of the other workpieces, from among the plurality of candidate holding points, a candidate holding point from which no other workpiece is present within the predetermined range, the processor is configured to generate information indicating that there is another workpiece within the predetermined range when, as the 3D information of the workpiece within the predetermined range is cut in parallel to a horizontal plane orthogonal to a height direction at a plurality of different height positions, there is a cutting plane that is discontinuous at at least one of the height positions, and a number of cuttings and an interval between the cuttings are determined based on an accuracy of a determination of the presence/absence of the another workpiece and an amount of calculation therefore.

11. A workpiece holding apparatus comprising:

a holder configured to attract and hold each workpiece in turn from among a plurality of workpieces placed in a 3D (three-dimensional) space;

a first sensor configured to acquire 3D information of the plurality of workpieces;

a processor that is configured to:

calculate, based on the 3D information of the plurality of workpieces acquired by the first sensor, a plurality of candidate holding points, the plurality of candidate holding points being, when the holder holds each of the workpieces in turn, candidates for a holding point of that workpiece;

acquire information about each of other workpieces present within a predetermined range from each of the candidate holding points on the workpieces; and select one of the plurality of candidate holding points based on the information about the workpiece acquired, and control the holder so that the holder holds the workpiece at the selected candidate holding point, wherein:

the information about each of the other workpieces is information about presence/absence of the other workpieces, the processor is configured to select, based on the information about the presence/absence of the other workpieces, from among the plurality of candidate holding points, a candidate holding point from which no other workpiece is present within the predetermined range, the processor is configured to generate information indicating that there is another workpiece within the predetermined range when, as the 3D information of the workpiece within the predetermined range is cut in parallel to a horizontal plane orthogonal to a height direction at a plurality of different height positions, there is a cutting plane that is discontinuous at at least one of the height positions, and a number of cuttings and an interval between the cuttings are determined based on an accuracy of a determination of the presence/absence of the another workpiece and an amount of calculation therefore.

* * * * *